May 26, 1964

M. J. DOLL 3,134,607

WAGON CHASSIS ARRANGEMENT

Filed Feb. 5, 1962

INVENTOR.
M. J. DOLL

BY

May 26, 1964  M. J. DOLL  3,134,607
WAGON CHASSIS ARRANGEMENT
Filed Feb. 5, 1962  3 Sheets-Sheet 2
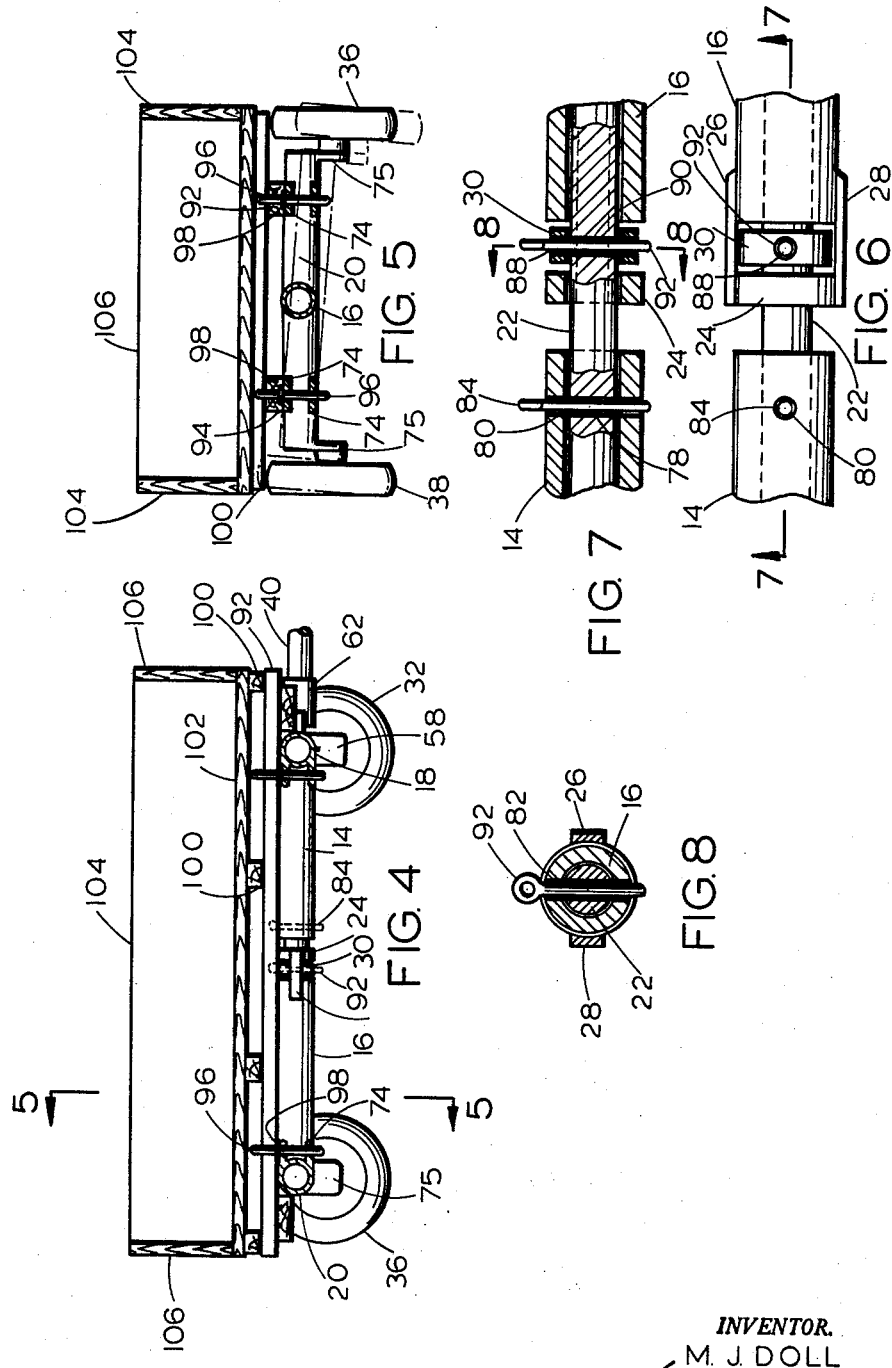
INVENTOR.
M. J. DOLL May 26, 1964 M. J. DOLL 3,134,607
WAGON CHASSIS ARRANGEMENT
Filed Feb. 5, 1962 3 Sheets-Sheet 3
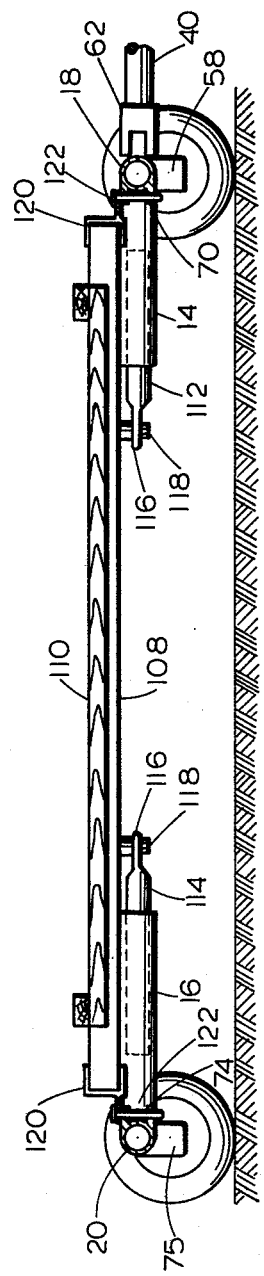
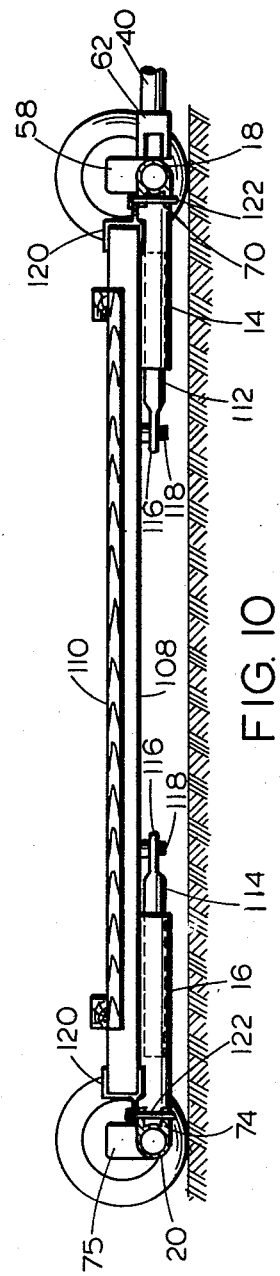
INVENTOR.
M. J. DOLL
BY

United States Patent Office 3,134,607
Patented May 26, 1964

3,134,607
WAGON CHASSIS ARRANGEMENT
Michael John Doll, P.O. Box 156, Decatur, Nebr.
Filed Feb. 5, 1962, Ser. No. 171,016
4 Claims. (Cl. 280—141)

This invention relates to wagon box or body carrying gear or frames wherein the box is positioned on bolsters of the frame or chassis, and in particular a chassis having wheels on the ends of front and rear bolsters in which the bolsters are connected by a telescoping beam, or link pipes, and wherein the bolsters are reversible to support the box in a low-hung position to facilitate loading, or in a high position to provide clearance, and also in which a tongue extends forwardly from the bolster at the front of the vehicle.

The purpose of this invention is to provide a wagon box or trailer chassis in which front and rear bolster assemblies may be independently mounted on a box, body, or trailer.

Various types of frames have been provided for supporting wagon boxes and trailers, and although such frames are adjustable, it is difficult to connect elements of the frames so that they may be separated and used independently.

With this thought in mind this invention contemplates a chassis for a wagon box or trailer body wherein the front and rear bolsters are separable and designed to be used on ends of long trailer platforms or bodies.

Another object of the invention is to provide bolsters of wagon boxes and trailers in which supporting elements thereof are adjustable so that platforms of the wagons or trailers may be supported in low-hung or elevated positions.

Another important object of the invention is to provide a chassis for a wagon or other vehicle in which assemblies at the ends of the chassis may be independently mounted on ends of elongated platforms of vehicles.

A further object of the invention is to provide a chassis for wagon boxes and trailers wherein telescoping connections between the bolsters are provided with swivel joints.

A still further object is to provide an adjustable chassis for vehicles in which the chassis is of simple and economical construction.

Other and further objects and advantages of the present invention will be apparent from the following detailed description, drawings and claims, the scope of the invention not being limited to the drawings themselves as the drawings are only for the purpose of illustrating a method in which the principles of this invention can be applied.

Other embodiments of the invention utilizing the same or equivalent principles may be used and structural changes may be made as desired by those skilled in the art without departing from the present invention and the purview of the appended claims.

In the drawings:

FIGURE 4 is a longitudinal section through a vehicle similar to that shown in FIGURE 3, and with a wagon box positioned on the chassis.

FIGURE 5 is a cross section through a wagon, such as that shown in FIGURE 4, being taken on line 5—5 of FIGURE 4, and with the chassis shown in a tilted position in broken lines.

FIGURE 6 is a plan view of the telescoping portion of the center beam connecting the front and rear bolsters with ends of the beam broken away, and with the parts shown on an enlarged scale.

FIGURE 7 is a longitudinal section through the telescoping connection being taken on line 7—7 of FIGURE 6, and also with parts broken away.

FIGURE 8 is a cross section through the telescoping portion of the center beam being taken on line 8—8 of FIGURE 7.

FIGURE 9 is a longitudinal section similar to that shown in FIGURE 4 with end portions of the chassis separated and mounted independently on ends of a platform, and with the bolsters turned so that the platform is in an elevated position.

FIGURE 10 is a longitudinal section similar to that shown in FIGURE 9, except that the bolsters or axles are turned whereby the platform is in a low-hung position.

Figure 2:
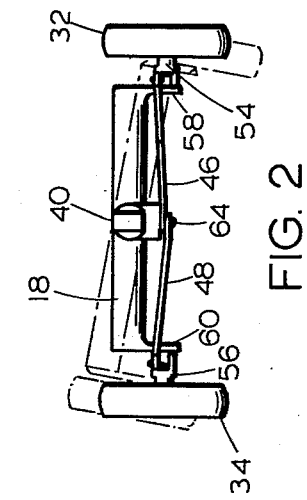
FIGURE 2 is a front elevational view of the chassis shown in FIGURE 1, with the parts shown in tilted positions in broken lines.
Figure 3:
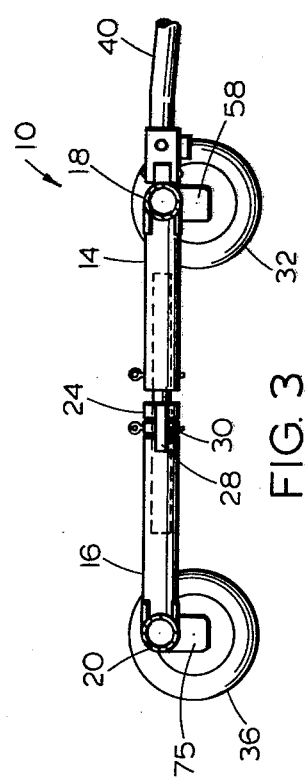
FIGURE 3 is a longitudinal section through the chassis taken on line 3—3 of FIGURE 1, and also with part of the tongue broken away.
Figure 1:
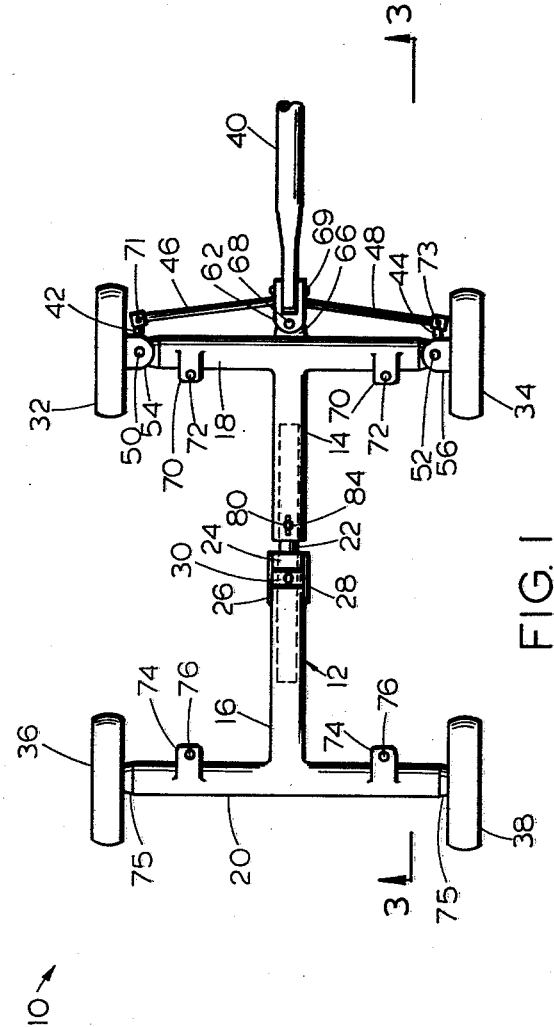
FIGURE 1 is a plan view showing the chassis of the present invention with forward and rear bolsters connected by a center beam having a telescoping joint therein, and with part of the tongue broken away.

While one embodiment of the invention is illustrated in the above-referred-to drawings, it is to be understood that they are merely for the purpose of illustration and that various changes in construction may be resorted to in the course of manufacture in order that the invention may be utilized to the best advantage according to circumstances which may arise, without in any manner departing from the spirit and intention of the device, which is to be limited only in accordance with the appended claims. And while there is stated the primary field of utility of the invention it remains obvious that it may be employed in any other capacity wherein it may be found applicable.

In the accompanying drawings, and in the following specification, the same reference characters are used to designate the same parts and elements throughout, and in which the numeral 10 refers to the invention in its entirety, numeral 12 indicating a telescoping center beam having a tubular stem section 14 at the forward end and a tubular stem section 16 at the rear, the section 14 extending from a forward bolster 18 formed of two aligned cross-arms connected to the tubular stem section 14, and the section 16 extended from a rear bolster 20, formed of two aligned cross arms connected to the tubular stem section 16, numeral 22 indicating a rod positioned with one end extended into the forward section 14 of the beam and the other into the section 16 of the rear bolster 20, numeral 24 a collar on the rod 22 and connected by straps 26 and 28 to the section 16, numeral 30 indicating a tilting collar mounted on the rod 22 and positioned between the section 16 and collar 24, numerals 32 and 34 wheels on ends of the forward bolster 18, numerals 36 and 38 wheels on ends of the rear bolster 20, and numeral 40 a tongue extended forwardly from the bolster 18 and connected to the wheels 32 and 34 by arms 42 and 44 and tie rods 46 and 48.

The wheels 32 and 34 are pivotally mounted by pins 50 and 52 on yokes 54 and 56 from which the arms 42 and 44 extend, and the yokes are mounted on offset lugs 58 and 60 at the ends of the bolster or axle.

The tongue 40 is pivotally mounted in a clevis 62 to which the tie rods 46 and 48 are connected by a pin 64, and the clevis is pivotally mounted on an ear 66, extended from the bolster 18, by a pin 68. The tongue 40 is pivotally connected to the clevis 62 by a pin 69. The bolster 18 is also provided with tabs 70 having openings 72 therein, and the bolster is secured to a platform or box by bolts extended through the openings of the tabs. The tie rods 46 and 48 are pivotally connected to the arms 42 and 44 of the yokes 54 and 56 by pins 71 and 73. The bolster 20 is also provided with tabs 74, in which openings 76 are provided for bolts for attaching the bolster to a box or platform. The bolster 20 is provided with offset ends 75.

The rod 22, connecting the sections 14 and 16 of the telescoping beam 12 is provided with spaced openings 78 which are positioned to register with an opening 80 of the section 14. The openings 78 and 80 are positioned to receive a pin 84 for retaining the parts in assembled relation. The collar 30 is also provided with an opening 88 which is in registering relation with an opening 90 in the rod 22 whereby the collar 30 is retained in position on the rod 22, and by which tilting of one bolster in relation to the other is obtained.

The rod 22 provides a slidable, and at the same time turning connection between the longitudinally disposed stem portions 14 and 16 of the T-shaped bolsters.

The tabs 74, and also the tabs 70 extend from both upper and lower surfaces of the bolsters, and beams 92 and 94 of a wagon box are retained in position on the tabs of the bolsters by bolts 96 which are provided with collars 98 that rest upon upper surfaces of the tabs, as shown in FIGURE 4. The wagon box is provided with cross beams 100 that rest on the beams 92 and 94. The floor 102 of the wagon box is mounted on the cross beams 100 and side walls 104 and end walls 106 of the box extend upwardly from the floor.

In the design illustrated in FIGURES 9 and 10 the rod 22 is removed and the sections 14 and 16 separated and extended to positions on opposite ends of beams 108 of a platform 110. The rod 22 is replaced by rods 112 and 114, flattened ends 116 of which are secured by posts 118 to members of the platform. Ends of the platform are retained by C-shaped brackets 120 to the tabs of the bolster by bolts 122.

In the design shown in FIGURE 9 the offset lugs 58 and 60 of the bolsters extend upwardly forming an elevated platform which provides clearance below the platform to facilitate traveling, and in FIGURE 10, the offset lugs extend downwardly providing a low-hung platform, or low boy which facilitates loading and unloading.

The platform, or wagon box or body may, therefore, be positioned high or low, as may be desired.

*Operation*

With the parts assembled as illustrated and described a wagon box or trailer is secured by the bolts to the tabs extended from the front and rear bolsters, providing a conventional vehicle.

The offset portions at the ends of the bolsters or axles may be turned upwardly to provide a high body for clearance, or downwardly to facilitate loading and unloading.

From the foregoing description, it is thought to be obvious that a wagon chassis arrangement constructed in accordance with my invention is particularly well adapted for use by reason of the convenience and facility with which it may be assembled and operated, and it will also be obvious that my invention is susceptible of some change and modification without departing from the principles and spirit thereof, and for this reason I do not wish to be understood as limiting myself to the precise arrangement and formation of the several parts herein shown in carrying out my invention in practice, except as claimed.

Having now described the invention that which is claimed to be new and desired to be procured by Letters Patent is:

1. A vehicle chassis comprising a T-shaped forward bolster including a tubular stem with cross-arms having vertically offset ends extended from the forward end, a T-shaped rear bolster including a tubular stem with cross-arms having vertically offset ends extended from the rear end, wheels mounted on the offset ends of the cross-arms, a tongue pivotally mounted on and extended from the forward bolster, tie rods connecting the tongue to the wheels of the cross-arms of the forward bolster, a rod slidably and rotatably mounted in inwardly extended ends of the tubular stems of the bolsters, a collar spaced from the forward end of the stem of the rear bolster and secured to said stem, said collar being positioned so that the rod extends therethrough, a tilting collar mounted on said rod and positioned between the forward end of the stem of the rear bolster and collar secured thereto, and means slidably connecting said rod to the stem of the forward bolster.

2. A vehicle chassis as described in claim 1, wherein the offset ends of the cross-arms are mounted to extend upwardly or downwardly.

3. In combination with a vehicle chassis as described in claim 1, means for attaching the bolsters to a vehicle body.

4. In combination with a vehicle chassis as described in claim 1, means for attaching the bolster assemblies to a vehicle body independently.

References Cited in the file of this patent

UNITED STATES PATENTS

| | | |
|---|---|---|
| 452,376 | Holley | May 19, 1891 |
| 2,523,790 | Thiel | Sept. 26, 1950 |
| 2,560,144 | Voorhees | July 10, 1951 |
| 2,631,045 | McElhinney et al. | Mar. 10, 1953 |
| 2,675,247 | Meng | Apr. 13, 1954 |

FOREIGN PATENTS

| | | |
|---|---|---|
| 224,268 | Great Britain | Nov. 10, 1924 |